United States Patent Office 3,484,354
Patented Dec. 16, 1969

3,484,354
EFFECTING ALKYLATION OF PARAFFINIC HYDROCARBONS WITH OLEFINS UNDER ULTRAVIOLET IRRADIATION
Frank J. Chloupek, South Holland, Ill., assignor to Sinclair Research, Inc., New York, N.Y., a corporation of Delaware
No Drawing. Filed Sept. 6, 1966, Ser. No. 577,153
Int. Cl. B01j 1/10; C07c 3/50
U.S. Cl. 204—162                    10 Claims

ABSTRACT OF THE DISCLOSURE

Paraffinic hydrocarbons of from 3 to 6 carbon atoms are alkylated with olefins containing from about 2 to 8 carbon atoms under the effect of ultraviolet irradiation and alkylating conditions including a temperature of from about 50 to 1000° F., to obtain high selectivity of alkylate in the gasoline boiling range. The ultraviolet irradiation is in amounts of about 15 to 500 kwh. per hour per pound, with a wave length of about 1000 to 3000 A., and can be the sole means to effect alkylation. The paraffin-olefin mixture subject to ultraviolet irradiation may also contain a free-radical initiator such as bromine, halogenated hydrocarbons, mercaptans, organic sulfides and disulfides, hydrogen sulfide and organic peroxides, to increase the selectivity to alkylate in the gasoline boiling range.

---

The present invention relates to an improved alkylation of paraffinic hydrocarbons with olefins to produce produce paraffins of higher molecular weight. More particularly, it concerns the use of selected wave lengths of ultra-violet irradiations to enhance reactions of paraffinic hydrocarbons with olefins.

Commercially, paraffin-alkylation processes are generally catalyzed in the liquid phase with either hydrofluoric acid, sulphuric acid, or aluminum chloride. However, these catalysts are difficult to handle, must generally be regenerated in another location and usually require refrigeration to minimize undesirable side reactions. Also, the selectivity of the olefins to alkylates in current alkylation processes have not been satisfactory.

The infeasibility of fixed-bed alkylation to date has stemmed from a lack of suitable catalysts to selectively catalyze the reaction, and among other problems, an inability to regenerate effectively the few catalysts such as resins and Friedel-Craft complexes which will promote this reaction. The foregoing factors, among others, are responsible for the high operating costs and undesirable results associated with the present type of liquid and solid phase paraffin alkylations. Accordingly, there is a need for an improved alkylation process.

The method of the present invention produces gasoline boiling range hydrocarbons in a system in which catalyst regeneration is unnecessary. The improved process gives good selectivity of olefin to alkylate per pass.

In the present invention the alkylation of paraffins with olefins may be obtained, by illuminating a mixture of at least one paraffin, either branched or straight-chain, and at least one olefin, either branched or straight-chain, with ultra-violet irradiation of selected wave lengths under alkylation conditions, e.g., elevated temperatures of about 50 to 900° F., and pressures of about 0.1 to 100 atmospheres. In the past, the use of processes involving ultraviolet irradiation have been avoided due to their high cost. However, the process of the present invention, using ultra-violet irradiation to induce alkylation, is attractive because excellent selectivity in catalyzing the reaction to form alkylate can be achieved. Improvement in the selectivity can be realized by providing a free-radical, chain transfer agent or initiator in the paraffin-olefin mixture subject to the ultra-violet irradiation treatment.

The irradiation of the paraffin-olefin mixture, with or without the initiator, can be carried out in the liquid or vapor phase, although the vapor phase is preferred. An ultra-violet irradiation source which can produce a wave length in the range of about 1000 to 3000 A., may be used to catalyze the alkylation reaction. Since irradiation energy and conversion to alkylates is increased as the wave length is decreased, an advantageous range of irradiation wave lengths is about 1000 to 1500 A. The irradiation dosages in these wave lengths may often be about 15 to 500 kwh./hr./lb., preferably about 50 to 200 kwh./hr./lb., of feed. The length of time the alkylation reactants are exposed to ultraviolet irradiation can vary widely depending upon such factors as the amount of reactants, irradiation wave length, dosages, etc. Consequently the exposure is for the length of time necessary to substantially catalyze the paraffin/olefin mixture to alkylation. Often the residence time will be about 1 to 60 minutes, preferably about 5 to 20 minutes.

Typical sources of ultra-violet light which can be used includes the Hanovia model 79A10, 450 watt ultra-violet burner, the carbon arc, mercury vapor lamps, tungsten arc, Kromeyer lamps, etc. Since high energy irradiation is necessary to fragment the olefins in producing alkylates of higher molecular weight, the use of infrared lamps, which are a low energy level form of radiation, is precluded.

The paraffins and olefins to be used in the process may be derived from any suitable source as is known in the art, and may be in either the pure state or in mixture with other constituents which will not affect the alkylation reaction. Although isoparaffins are the preferred hydrocarbons that can be alkylated, n-paraffins can also be alkylated in accordance with the present invention. As examples of the paraffinic hydrocarbons that can be alkylated, there can be mentioned any of the paraffins or isoparaffins containing from about 3 to 6 carbon atoms, preferably about 3 to 4 carbon atoms, such as, for example, propane, n-butane, isobutane, n-pentane, isopentane, etc.

The alkylating agents suitable for use in the present process are olefins, generally containing from 2 to about 8 carbon atoms, preferably from 2 to about 4 carbon atoms. Monoolefins are preferred and they include ethylene, propylene, butylene, isobutylene, etc.

Among the initiators or chain transfer agents that can be used are halogens, e.g., chlorine, bromine and iodine; halogenated hydrocarbons such as carbon tetrachloride, chloroform, dichloroethane, methyl and ethyl bromide, bromopropane, and methyl and ethyl iodines; ketones, e.g. acetone; aldehydes, e.g., formaldehyde, mercaptans, such as aliphatic mercaptans, aryl mercaptans, arylakyl mercaptans, cycloaliphatic mercaptans, etc.; organic sulfides and disulfides; hydrogen sulfide; organic peroxides and the like. The initiators are often present in the mixture in a range of about 0.1 to 10% by weight, preferably about 0.5 to 2%.

The particular process conditions of temperature, pressure, residence time, etc, useful in this invention can vary and are usually chosen to satisfy the requirements of the particular materials being utilized.

The reaction is usually a vapor phase process; however, under certain reaction conditions, where a proper choice of reactants has been made, the reaction can be carried out in the liquid phase. Ordinarily, however, vapor phase reaction is preferred.

In carrying out the process of the present invention, temperatures of about 50 to 1000° F. may be employed, however, temperatures in the range of about 300 to 900° F. are generally preferred.

The pressure employed in the exercise of the present invention can vary widely. Alkylation with less volatile olefins can be effected at atmospheric pressure (ambient pressure) or lower, if desired; however, with normally gaseous olefins or with normally gaseous or low boiling isoparaffins, super atmospheric pressure is generally used in order to provide an adequate concentration of reactants to contact the catalyst under reaction conditions. Pressures in the range of about 0.1 to 100 atmospheres may be used; however, pressures of about 1 atmosphere to 80 atmospheres are generally preferred. The paraffinic space velocity, in most cases, will be from about 0.05 to 10, preferably from about 0.25 to 4, weights of paraffinic per weight of catalyst per hour (WHSV).

The paraffinic hydrocarbon is generally employed in a molar ratio to the alkylating agent of from about 1/1 to 100/1, and preferably from about 2/1 to 10/1. Diluent gases, e.g. inert or hydrocarbon, such as hydrogen, nitrogen and methane can also be utilized in the present process usually in the amounts ranging from a diluent gas to alkylating agent molar ratio of about 0.01/1 to 20/1 or more, preferably about 2/1 to 10/1.

The following examples are given only for purposes of illustration and are not to be considered limiting.

EXAMPLE I

A Hanovia model 79A10, 450 watt ultra-violet burner is placed within a 6 inch high cylindrical coil of 8 mm. O.D. quartz tubing (five feet in length). The assembly is immersed in a quartz jar surrounded by magnesium oxide to reflect stray light back into the reaction cavity. This area is cooled with a stream of air to maintain the desired temperature. The feed, which is a mixture of isobutane and ethylene, is irradiated, with the ultraviolet burner using irradiation dosages of about 25 kwh./hr./lb. The feeds were introduced by means of calibrated flow meters and the resulting alkylate was analyzed by gas phase chromatography. The test results are in Table I.

EXAMPLES II and III

Examples II and III were the same as Example I, except that the feed contained 2% carbon tetrachloride and 2% bromine by weight, respectively. The test results are in Table I.

TABLE I

| Example | I | II | III |
| --- | --- | --- | --- |
| Conditions: | | | |
| Temp./° F | 550 | 550 | 550 |
| Pressure/Atm | 1 | 1 | 1 |
| Paraffin | (¹) | (¹) | (¹) |
| Olefin | (²) | (²) | (²) |
| Par./Ole. mole ratio | 2 | 2 | 2 |
| Feed residence time/min | 10 | 10 | 10 |
| Results: Conversion on olefin | 1.2 | 3.2 | 7.0 |
| Selectivity to— | | | |
| n-Pentane | | 1.3 | 0.6 |
| i-Pentane | 9.1 | 7.3 | 6.0 |
| Neohexane | 52.0 | 65.8 | 82.0 |
| 2-methylpentane | 24.6 | 3.4 | 6.3 |
| 3-methylpentane | | 2.1 | |
| 2,3-dimethylbutane | 1.3 | 2.1 | |
| C₅⁻ | 9.1 | 6.0 | 3.4 |
| C₆⁻ | 3.9 | 12.0 | 1.7 |

¹ Isobutane.
² Ethylene.

As can be readily seen from Table I when using isobutane and ethylene as the reactants, an excellent selectivity to neohexane is achieved by the process of the present invention. Improvement in selectivity is realized by the presence of a free-radical initiator in the paraffin-olefin mixture of Examples II and III.

It is claimed:

1. A process of alkylating an alkylatable paraffinic hydrocarbon which consists essentially of reacting the alkylatable paraffinic hydrocarbon containing from about 3 to 6 carbon atoms with an olefin containing from about 2 to 8 carbon atoms, under the effect solely of ultra-violet irradiation in amounts of about 15 to 500 kwh. per hour per pound, with a wavelength of about 1000 to 3000 A. to induce alkylation, at a temperature of about 50 to 1000° F.

2. The process of claim 1 wherein the alkylation temperature is from about 300 to 900° F.

3. A process of alkylating an alkylatable paraffinic alkylatable paraffinic hydrocarbon containing from about 3 to 4 carbon atoms and selected from the group consisting of n-paraffins and iso-paraffins with an olefin containing from about 2 to 4 carbon atoms, said mixture containing a free-radical initiator, under the effect of ultra-violet irradiation in amounts of about 25 to 200 kwh. per hour per pound and having a wave length of about 1000 to 1500 A., and at a temperature of about 300 to 900° F.

4. A process of alkylating an alkylatable paraffinic hydrocarbon which consists essentially of reacting the alkylatable paraffinic hydrocarbon containing from about 3 to 6 carbon atoms and selected from the group consisting of n-paraffins and iso-paraffins with an olefin containing from about 2 to 8 carbon atoms under the effect of ultra-violet irradiation in amounts of about 15 to 500 kwh. per hour per pound, with a wave length of about 1000 to 3000 A. to induce alkylation at a temperature of about 50 to 1000° F., the paraffin-olefin mixture containing a free-radical initiator selected from the group consisting of bromine, halogenated hydrocarbons, mercaptans, organic sulfides and disulfides, hydrogen sulfide, and organic peroxides.

5. The process of claim 4 wherein the free-radical initiator is present in the paraffin-olefin mixture in an amount of about 0.5 to 2% by weight.

6. The process of claim 4 wherein the paraffinic hydrocarbon is isobutane and the olefin is ethylene.

7. The process of claim 4 wherein the ultraviolet irradiation is in amounts of about 50 to 200 kwh. per hour per pound and has a wave length of about 1000 to 1500 A., and the alkylating temperature is of about 300 to 900° F.

8. A process of alkylating isobutane to obtain high selectivity to neohexane which consists essentially of reacting isobutane with ethylene under the effect solely of ultra-violet irradiation in amounts of about 15 to 500 kwh. per hour per pound, with a wave length of about 1000 to 3000 A. and at a temperature of about 50 to 1000° F. to induce alkylation.

9. A process of alkylating isobutane to obtain high selectivity to neohexane which consists essentially of reacting isobutane with ethylene under the effect of ultra-violet irradiation in amounts of about 15 to 500 kwh. per hour per pound, and with a wave length of about 1000 to 3000 A. and at a temperature of about 50 to 1000° F. to induce alkylation, the isobutane-ethylene mixture containing about 0.5 to 2 percent by weight of a free-radical initiator selected from the group consisting of bromine and carbon tetrachloride.

10. A process of alkylating an alkylatable paraffinic hydrocarbon which consists essentially of reacting the alkylatable paraffinic hydrocarbon containing from about 3 to 6 carbon atoms and selected from the group consisting of n-paraffins and iso-paraffins with an olefin containing from about 2 to 8 carbon atoms under the effect of ultra-violet irradiation in amounts of about 15 to 500 kwh. per hour per pound, with a wave length of about 1000 to 3000 A. and at a temperature of about 50 to 1000° F. to induce alkylation the paraffin-olefin mixture containing a free-radical initiator.

References Cited

UNITED STATES PATENTS

| | | | |
|---|---|---|---|
| 2,636,853 | 4/1953 | Franklin | 204—162 |
| 2,830,016 | 4/1958 | Cier et al. | 204—162 |
| 3,018,237 | 1/1962 | Lucchesi et al. | 204—162 |

HOWARD S. WILLIAMS, Primary Examiner

UNITED STATES PATENT OFFICE
CERTIFICATE OF CORRECTION

Patent No. 3,484,354            Dated December 16, 1969

Inventor(s) Frank J. Chloupek

It is certified that error appears in the above-identified patent and that said Letters Patent are hereby corrected as shown below:

Column 1, line 37 thereof, delete "catalized", and insert therefor --catalyzed--.

Column 4, delete line 19 in its entirety, beginning with the word "hydro".

Claim 3, line 1 thereof, delete "alkylatable paraffinic".

Claim 3, line 2 thereof, immediately after "hydrocarbon", insert --which consists essentially of reacting the alkylatable paraffinic hydrocarbon--.

SIGNED AND
SEALED
SEP 8 - 1970

(SEAL)
Attest:

Edward M. Fletcher, Jr.
Attesting Officer

WILLIAM E. SCHUYLER, JR.
Commissioner of Patents

FORM PO-1050 (10-69)            USCOMM-DC 60376-P69